United States Patent [19]
Duvernay

[11] Patent Number: 6,012,780
[45] Date of Patent: *Jan. 11, 2000

[54] BRAKE CONTROLLER FOR TRAILER BRAKES

[75] Inventor: Mark E. Duvernay, Mattawan, Mich.

[73] Assignee: Reese Products, Inc., Elkhart, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/806,810

[22] Filed: Feb. 26, 1997

Related U.S. Application Data

[60] Provisional application No. 60/015,196, Apr. 5, 1996.

[51] Int. Cl.[7] ........................................ B60T 13/00
[52] U.S. Cl. ........................... 303/7; 188/112 R; 303/20; 303/124; 303/24.1
[58] Field of Search ............................ 303/20, 24.1, 124, 303/123, 7.3, 15, 192

[56] References Cited

U.S. PATENT DOCUMENTS

| | | |
|---|---|---|
| 3,598,453 | 8/1971 | Riordan . |
| 3,909,075 | 9/1975 | Pittet, Jr. et al. . |
| 3,953,084 | 4/1976 | Pittet, Jr. et al. . |
| 3,993,362 | 11/1976 | Kamins et al. . |
| 4,076,327 | 2/1978 | Hubbard . |
| 4,295,687 | 10/1981 | Becker et al. ............................. 303/20 |
| 4,721,344 | 1/1988 | Frait et al. ................................ 303/20 |
| 4,852,950 | 8/1989 | Murakami ............................... 303/192 |
| 4,915,328 | 4/1990 | Nakamoto ............................... 303/192 |
| 5,080,445 | 1/1992 | Brearley et al. . |
| 5,149,176 | 9/1992 | Eccleston ................................. 303/20 |
| 5,226,700 | 7/1993 | Dyer ....................................... 303/20 |
| 5,333,948 | 8/1994 | Austin et al. ............................ 303/20 |
| 5,355,717 | 10/1994 | Tanaka et al. . |
| 5,423,601 | 6/1995 | Sigl ........................................ 303/192 |

*Primary Examiner*—Matthew C. Graham
*Attorney, Agent, or Firm*—King and Schickli

[57] ABSTRACT

A system and method are provided for controlling brakes on a trailer being towed by a towing vehicle. The system includes an accelerometer for sensing inclination and a rate of deceleration of the towing vehicle and providing inclination and rate of deceleration control signals indicative thereof. A controller is provided that is responsive to the inclination and rate of deceleration control signals received from the accelerometer. The controller is operatively connected to an amplifier and these functions together to send a proportionate brake amperage output signal to control the brakes on the trailer.

11 Claims, 2 Drawing Sheets

BRAKE CONTROLLER FOR TRAILER BRAKES

This application claims the benefit of U.S. Provisional Application Ser. No. 60/015,196, filed Apr. 5, 1996.

TECHNICAL FIELD

The present invention relates generally to the recreational vehicle field and, more particularly, to a system and method for controlling electric brakes on a trailer being towed by a towing vehicle.

BACKGROUND OF THE INVENTION

Electrical trailer brake control systems for controlling electric trailer brakes are well known in the art. An example of one prior art brake control system is the Reese Brakemann II trailer brake control system presently being commercially marketed by the assignee of the present invention.

SUMMARY OF THE INVENTION

It is a primary object of the present invention to provide a new and improved brake control system for controlling the brakes on a trailer being towed by a towing vehicle. Advantageously, the brake control system may be easily installed and requires minimum maintenance while providing highly reliable and dependable operation over a long service life.

Still another object of the present invention is to provide a trailer brake control system exhibiting greater sensitivity and enhanced response beyond that presently available with state of the art brake controllers.

Yet another object of the present invention is to provide a "smart" brake control system that automatically compensates not only for changes in the rate of deceleration of the towing vehicle under braking but also appropriately increases or decreases the brake amperage control signal as required in accordance with actual downhill or uphill braking conditions.

Still another object of the present invention is to provide a new and improved brake control system that is able to sense lock-up of the trailer brakes and in response thereto systematically reduces the brake amperage control signal to reeffect the desired braking performance.

Still another object of the present invention is to provide a brake control system that eliminates the "hazard light pulsing" problem.

Yet an additional object of the present invention is to provide a brake control system with manual and optional remote manual overdrive as well as remote operator interface and feedback subsystems which indicate improper connection of the brake controller to the electric trailer brakes during installation and also serve to identify the loss of or malfunction of brake units during operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved system is provided for controlling brakes on a trailer being towed by a towing vehicle. The brake system includes a means, such as an accelerometer for sensing the rate of deceleration of the towing vehicle. Further, the accelerometer may be utilized to sense inclination of the towing vehicle: that is, the presence of the towing vehicle traversing an uphill or downhill grade.

The system also includes a controller, preferably including a dedicated fuzzy logic microcontroller and an amplifier for generating the brake amperage output signal to control the electric trailer brakes. More specifically, the controller is responsive to inclination and rate of deceleration control signals received from the accelerometer and then functions to send a proportionate brake amperage output signal to control the brakes on the trailer.

Still more preferably, the brake control system also includes a means for sensing the actuation of the brakes of the towing vehicle and a means for sending a towing vehicle actuation signal to the controller. The controller only sends a proportionate brake amperage output signal to control the brakes of the trailer when both rate of deceleration and brake actuation control signals are received simultaneously by the controller. In the absence of the brake actuation signal, the controller does not send a brake amperage output signal to initiate trailer braking. Accordingly, any possibility of inadvertent trailer braking in response to sensed deceleration occurring under non braking conditions, such as when traversing uphill grades, is eliminated.

The brake control system also includes a means for manually overriding the system so as to thereby allow a proportionate brake amperage output signal to be produced when desired by the vehicle operator even in the absence of either or both of the rate of deceleration and brake actuation control signals. This may be desirable under certain operating conditions in order to control trailer sway or where the vehicle operator wishes to apply the trailer brakes prior to the vehicle brakes.

Still further, the brake control system includes a brake amperage feedback indicator. Such an indicator may, for example, include a series of LED lights, a digital gauge or an analog gauge for indicating the amperage of the brake output signal being sent to control trailer braking. In this way the operator is better able to monitor the operation of the system and may confirm, for example, brake unit loss or malfunction. The system also allows the operator to visually adjust the braking bias between the trailer and towing vehicle in accordance with operator preference and current driving conditions.

Still further, the brake control system includes a temperature sensor which is connected to the controller to allow compensation for temperature drift of the accelerometer. Accordingly, the trailer control system provides consistent operation under substantially any reasonably anticipatable climatic conditions.

As an additional convenience feature, the brake control system may include a means for indicating improper connection of the system to the brakes on the trailer. Further, a circuit breaker/fuse may be provided in the wiring circuit for protecting the system from short circuit in the event of improper connection to the battery or brakes of the trailer. Accordingly, the operator installer is warned when improper connection occurs and the brake control system is simultaneously protected from any possibility of damage due to that improper connection.

In accordance with yet another aspect of the present invention, a method is provided for controlling the brakes on a trailer being towed by a towing vehicle. The method includes sensing the rate of deceleration of the towing vehicle and sending a proportionate brake amperage output signal to control the brakes of the trailer. Additionally, the method includes sensing the inclination of the towing vehicle and adjusting the proportionate brake amperage output signal in accordance with the sensed inclination. Accordingly, the brake amperage output signal is increased when the brakes are applied as the vehicle traverses downhill grades and reduced when the brakes are applied as the vehicle traverses uphill grades so as to provide the desired level of braking force at all times.

In accordance with a further aspect of the method there is a step of sensing actuation of the towing vehicle brakes and limiting the sending of the proportionate brake amperage output signal only to those situations where towing vehicle brake actuation and rate of towing vehicle deceleration are sensed and appropriate control signals are simultaneously received by the controller. Such an arrangement insures that the trailer brakes are only applied at appropriate times.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
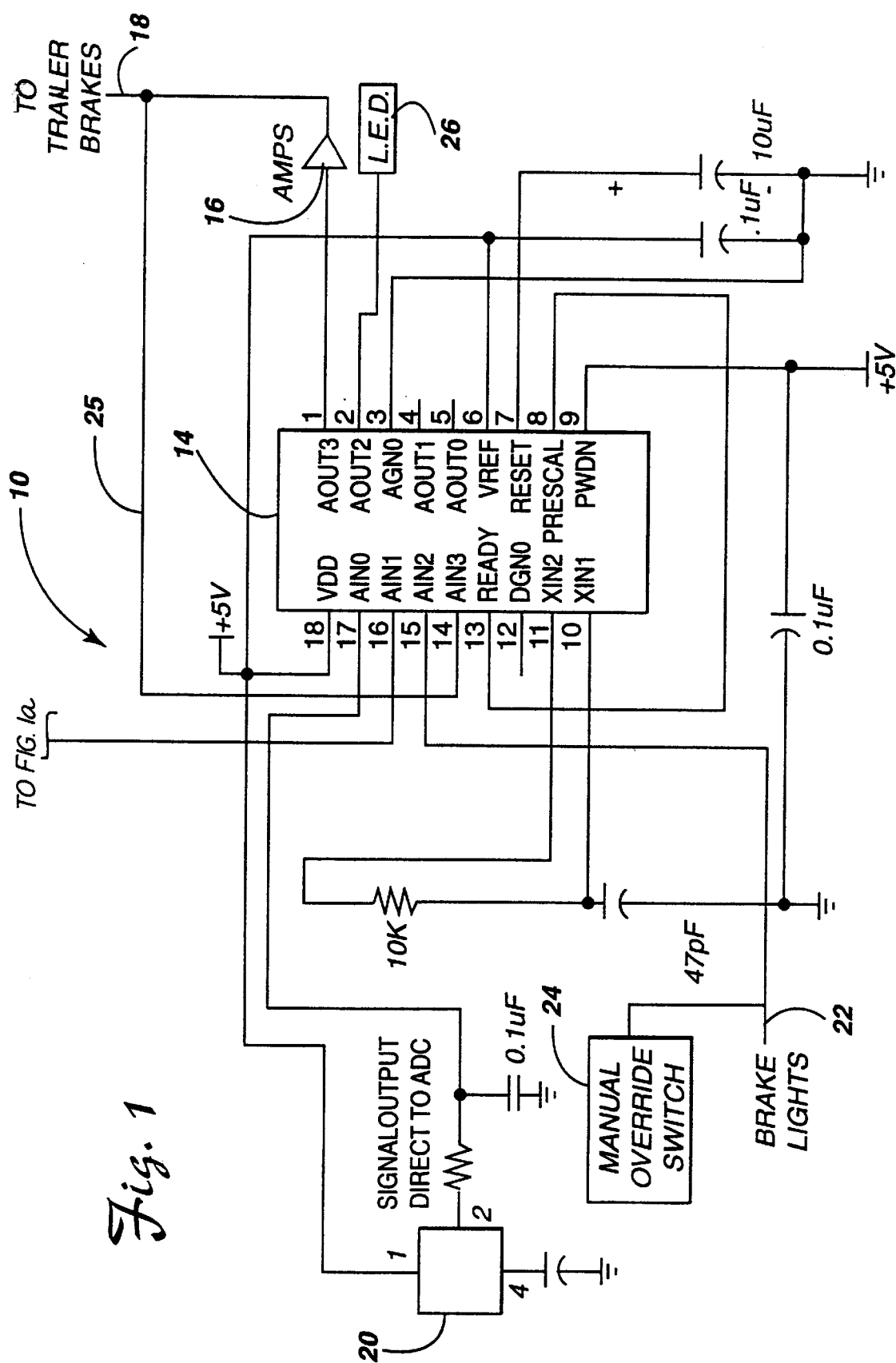
FIGS. 1 and 1a are schematics of the system of the present invention for controlling brakes on a trailer.
Figure 1A:
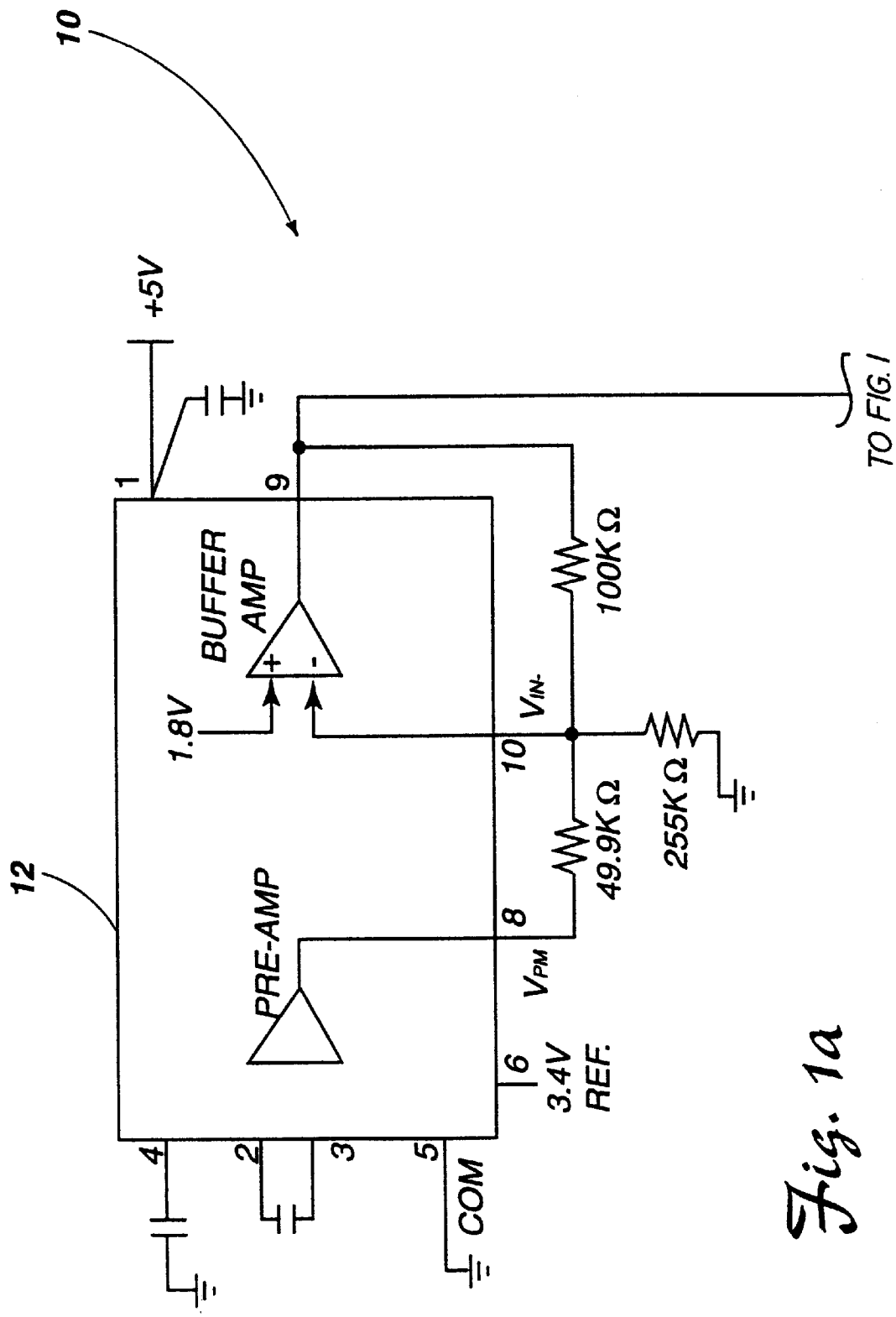

Reference is now made to FIGS. 1 and 1a showing a schematic of the brake control system 10 of the present invention. As shown, the brake control system 10 includes an accelerometer 12 such as an Analog Devices, Inc. ADX05 Accelerometer having a resolution of 5 g and a microcontroller 14. Advantageously, the accelerometer 12 may be utilized to not only sense the rate of deceleration for the towing vehicle in which the brake control system 10 is mounted but also the tilt or inclination of the vehicle: that is whether the vehicle is traveling uphill or downhill. This may be done, for example, by processing the lower bandwidth signals from the accelerometer as tilt or inclination and the higher bandwidth signals as deceleration. Specifically, the accelerometer 12 monitors tilt so long as no input is received at pin number 15 of the microcontroller 14. This tilt angle is continually updated and stored. Once the vehicle brake lights are engaged or the manual override switch is depressed, a signal is received at pin number 15. The signal from the accelerometer at input 16 of the microcontroller 14 is then processed as a rate of deceleration and uphill/downhill adjustments in the brake amperage are made in accordance with the last stored value of the tilt angle.

Preferably, the microcontroller 14 is a fuzzy logic microcontroller such as an Adaptive Logic AL22OPC. As will be appreciated from the following, the combination of the accelerometer 12 and microcontroller 14 serves to provide "smart" braking through the electrical trailer brakes to which the system 10 is connected.

More specifically, the accelerometer 12 provides an inclination control signal and a rate of deceleration control signal to the microcontroller 14 that are indicative of the inclination and rate of deceleration of the towing vehicle. The microcontroller 14 instantaneously processes this information and through its operative connection to the amplifier 16 sends a proportionate brake amperage output signal along the control line 18 to control the brakes on the trailer. The greater the rate of deceleration of the towing vehicle, the greater the brake amperage output signal to the trailer brakes in order to apply greater braking power. The strength of the brake amperage output signal is, however, modified by the sensed inclination of the towing vehicle. Accordingly, the normal brake amperage output signal for level terrain operation is modified and increased when downhill inclination is sensed and reduced when uphill inclination is sensed. As a result the system 10 of the present invention, provides full and effective real time compensation for road grade conditions.

As should further be appreciated, the system 10 includes many additional operating features that significantly enhance the performance thereof. For example, a temperature sensor 20 is connected to the controller 14 and functions to compensate for fluctuations in the sensing capabilities of the accelerometer 12 due to temperature drift.

Additionally, the system 10 includes a means for sensing actuation of the brakes of the towing vehicle and sending a towing vehicle brake actuation signal to the controller 14. More specifically, a wire conductor 22 is connected between the brake light circuit of the towing vehicle and the controller 14. When the towing vehicle brakes are engaged, the towing vehicle brake lights are energized and this electrical signal is carried by the conductor 22 to the controller 14 thereby giving the controller an indication of towing vehicle brake engagement. The controller 14 is programmed so as to only provide a brake amperage output signal along line 18 proportionate to the sensed inclination and rate of deceleration when the towing vehicle brakes have been engaged or activated. This eliminates any inadvertent braking that might otherwise result from the accelerometer providing a rate of deceleration signal under conditions where braking is not truly desired (e.g. such as when momentum is lost traversing an uphill grade).

The system 10 is also equipped with a means of manual override. More specifically, a manual override switch 24 is provided. When the manual override switch 24 is activated, the controller 14 provides a brake amperage output signal to the trailer brakes along line 18. This feature may be utilized by the vehicle operator under certain operating conditions including times when the operator is seeking to control trailer sway.

The system 10 also includes a brake amperage feedback indicator for indicating brake amperage to a towing vehicle operator so that the operator is able to monitor operation of the system (note feedback line 25 in FIG. 1). Preferably, the brake amperage feedback indicator 26 may take the form of an LED array as shown in the drawing Figure. It should be appreciated, however, that a digital or analog gauge could also be utilized. A switch, knob or other actuator (not shown) may be manually manipulated by the operator to adjust the strength of the brake amperage output signal as desired to control trailer brake/vehicle brake bias or for other purposes. Of course, the system 10 may also be equipped with a fuse or more preferably a circuit breaker to prevent damage to the accelerometer 12 and/or controller 14 in the event the controller 10 is improperly connected or wired to the towing vehicle or trailer brake system. Further, the circuit breaker may be wired so as to close a circuit to a warning lamp or beeper providing a video or audio signal indicating improper connection.

In summary, the present system 10 senses towing vehicle inclination as well as rate of deceleration in order to provide smart braking. The system 10 compensates for uphill and downhill operating conditions and sends a proportionate brake amperage output signal to control the braking force provided by the brakes of the trailer. The system 10 is also effective to provide maximum braking power. More specifically, the accelerometer 12 is capable of sensing a decrease in the rate of deceleration when the brakes lock up. This sensed decrease in the rate of deceleration causes the microcontroller 14 to step down or reduce the output from the power amplifier 16: that is, reduce the brake amperage output signal to the trailer brakes. As a result, braking force is reduced. This step down reduction in the power output of the amplifier 16 continues until the rate of deceleration again increases as a result of the wheels with which the trailer brakes cooperate taking hold on the road surface.

The system 10 also compensates for and eliminates the problem of hazard light pulsing. More specifically, the microcontroller 14 is capable of learning the hazard light pulse pattern of the vehicle and ignoring this input when controlling trailer braking. Accordingly, it should be appreciated that the braking system and method of the present invention provide a number of advantages and features unavailable in prior art brake systems design.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A method for controlling brakes on a trailer being towed by a towing vehicle, comprising:

sensing rate of deceleration of one of the towing vehicle and the trailer;

sensing inclination of one of the towing vehicle and the trailer;

generating a variable deceleration signal as a function of said rate of deceleration and a variable inclination signal as a function of said sensed inclination;

sending a brake amperage output signal to control the brakes on the trailer; and continuously proportioning said brake amperage output signal in accordance with both said deceleration and said inclination signals.

2. The method of claim 1 further including the steps of:

forwarding a towing vehicle brake actuation signal to a controller upon sensing the rate of deceleration of the towing vehicle;

forwarding the inclination signal to said controller upon sensing the inclination of one of said vehicles; and wherein the steps of continuously proportioning and sending the brake amperage output signal to control the brakes of the trailer occur when the brake actuation control signal and the vehicle inclination signal are received by said controller.

3. The method of claim 2 further including the steps of:

sensing an ambient temperature; and forwarding a sensed temperature signal to said controller to allow compensation for temperature drift during the step of sensing the rate of deceleration and the inclination of one of said trailer and said towing vehicles.

4. The method of claim 1 further including the step of indicating to a towing vehicle operator the brake amperage so that the operator is able to monitor operation of the towing vehicle and trailer.

5. The method of claim 4 further including the step of adjusting the brake amperage control signal dependent upon said indicating step by the operator.

6. The method of claim 1 further including the steps of:

sensing an improper connection to the towing vehicle or the brakes of the trailer; and indicating the improper connection to the towing vehicle operator.

7. The method of claim 6 further including the steps of protecting the brake control system in the event of improper connection to the towing vehicle and the brakes of the trailer utilizing circuit breakers/fuses.

8. A method for adjustably controlling brakes on a trailer being towed by a towing vehicle comprising the steps of:

sensing a deceleration of said towing vehicle;

sensing the actuation of said towing vehicle brakes;

forwarding a towing vehicle brake actuation signal to a controller upon sensing the deceleration of said vehicle;

sensing an inclination of one of said trailer and said towing vehicles;

forwarding a vehicle inclination signal as a function of said sensed inclination to said controller upon sensing said inclination;

sending a continuously proportionately adjusted brake output signal to control the brakes of the trailer when the brake actuation, the deceleration and the vehicle inclination signals are received by said controller.

9. The method of claim 8 further including the steps of:

indicating to a towing vehicle operator a brake control signal amperage so that the operator is able to monitor operation of the towing vehicle and trailer; and manually adjusting the brake control signal dependent upon said indicating step.

10. A method for controlling brakes on a trailer being towed by a towing vehicle, comprising:

sensing rate of deceleration of one of the towing vehicle and the trailer;

sensing inclination of one of the towing vehicle and the trailer;

monitoring the sensed rate of inclination;

continually updating and storing the sensed inclination in a memory;

sensing the actuation of said towing vehicle brakes;

sending a brake amperage output signal to control the brakes on the trailer; and proportioning said brake amperage output signal in accordance with both said stored sensed inclination and said deceleration signal.

11. The method of claim 10 further including the steps of:

sensing an ambient temperature; and adjusting said brake amperage output signal to allow compensation for temperature drift during the step of sensing the rate of deceleration and the inclination of one of said trailer and said towing vehicles.

* * * * *